(12) United States Patent
Gerstel (10) Patent No.: US 9,154,859 B2
(45) Date of Patent: Oct. 6, 2015

(54) PROACTIVE OPTICAL RESTORATION SYSTEM

(71) Applicant: Cisco Technology, Inc., San Jose, CA (US)

(72) Inventor: Ornan Alexander Gerstel, Hamerkas (IL)

(73) Assignee: Cisco Technology, Inc., San Jose, CA (US)

(*) Notice: Subject to any disclaimer, the term of this patent is extended or adjusted under 35 U.S.C. 154(b) by 144 days.

(21) Appl. No.: 13/945,694

(22) Filed: Jul. 18, 2013

(65) Prior Publication Data

US 2015/0023663 A1    Jan. 22, 2015

(51) Int. Cl.
*H04Q 11/00* (2006.01)

(52) U.S. Cl.
CPC ................. *H04Q 11/0005* (2013.01)

(58) Field of Classification Search
CPC .................................... H04Q 11/0005
USPC ........................................ 398/49
See application file for complete search history.

(56) References Cited

U.S. PATENT DOCUMENTS

| | | | | |
|---|---|---|---|---|
| 7,835,267 | B2* | 11/2010 | Zamfir et al. | 370/216 |
| 2002/0109879 | A1* | 8/2002 | Wing So | 359/118 |
| 2002/0118414 | A1* | 8/2002 | Yuki et al. | 359/119 |
| 2013/0142511 | A1* | 6/2013 | Spraggs et al. | 398/51 |

OTHER PUBLICATIONS

O. Gerstel et al., Near-Hitless Protection in IPoDWDM Networks, 2008, Optical Fiber Communication/National Fiber Optic Engineers Conference Feb. 4, 2008, 3 pgs.
O. Gerstel et al., IP-optical interaction during traffic restoration, 2013, Optical Fiber Communication/National Fiber Optic Engineers Conference Mar. 17, 2013, 3 pgs.

* cited by examiner

*Primary Examiner* — David Payne
*Assistant Examiner* — Omar S Ismail (57) ABSTRACT

A router configured to communicate data with a destination router over an IP path that includes an IP link that uses a first optical path. The router configured to proactively maintain the performance of the communication of data. The router configured to receive a signal to move the communication off of the first optical path, before performance of the first optical path has failed. The router configured to establish a second optical path to the destination router an associate the IP link with the second optical path and move the communication of data with the destination router to the second optical path. The router may optionally be configured to tear down the first optical path. The trigger received by the router may be an indication of a performance degradation of the first optical path or an indication of a router interface used by the IP link being switched into maintenance mode.

19 Claims, 5 Drawing Sheets

PROACTIVE OPTICAL RESTORATION SYSTEM

FIELD

The present disclosure relates to optical networks, and more specifically, to optical network resilience.

BACKGROUND

The architecture of large Internet Protocol (IP) networks is based on routers that connect to a Wavelength-Division Multiplexing (WDM) or Dense Wavelength-Division Multiplexing (DWDM) system directly via transponders. In such systems, the DWDM layer provides low cost transport, but does not provide protection against signal failures. The routers provide all such protection via mechanisms such as Internal Gateway Protocol convergence or Multiprotocol Label Switching Fast Re-Route. These protection mechanisms can be initiated proactively when a link on a path in the network degrades. But, such protection is at the router level, i.e. at the IP layer, and that the IP layer needs extra capacity to be available necessary for such protection mechanisms, resulting in a higher overall cost of the network.

Another signal failure protection mechanism is multi-layer restoration. Multi-layer restoration, enables restoring full capacity of the IP layer, by switching the path of the affected IP links in the DWDM layer. If the IP layer is not involved in coordinating the restoration process, and it happens spontaneously by the optical layer, the mechanism is called optical restoration.

DESCRIPTION OF EXAMPLE EMBODIMENTS

Overview

By way of introduction, the example embodiments described below include a device and method to manage resilience of an optical network. The device and method may be used to move communication of data off of an optical path between a source router and a destination router.

According to a first aspect, the device may include a communication module configured to communicate data with a destination router over an IP path comprising an IP link that uses a first optical path. The device may also include a controller module configured to receive a signal to move the communication of data away from the first optical path, where communication performance of the first optical path has degraded but is still in an acceptable range. An optical path manager of the device may establish a second optical path to the destination router. An IP link manager may associate the second optical path with the IP link. The communication module may move the communication of data with the destination router to the second optical path and the optical path manager may tear down the first optical path.

In a second aspect, a method may provide establishing an IP path for data transfers between a first router and a second router over an optical network, the first IP path including an IP link. The IP link may be associated with a first optical path through the optical network. The method may provide triggering establishment of a second optical path between the first router and the second router, proactively, before communication performance rating of the first optical path crosses a predetermined threshold that indicates failure of communication over the first optical path. The IP link may be associated with the second optical path and moving the data transfers between the first router and the second router via the first optical path to the second optical path.

In a third aspect, a system is provided where communication of data between a source router and a destination router over a first optical path is moved off to a second optical path. The first optical path may be associated with an IP link between the source and destination routers. The second optical path may be associated to the IP link too. The system may move the communication in response to a trigger signal. The trigger signal may indicate a degradation of the communication performance over the first optical path. The trigger signal may indicate a resource on the IP link being switched into maintenance mode. The system may temporarily move the communication via a second IP link and one or more intermediate routers before the communication is reverted to the first IP link and the second optical path.

Further aspects and advantages are discussed below in conjunction with the example embodiments.

Example Embodiments

It is to be understood that the following description of examples of implementations are given only for the purpose of illustration and are not to be taken in a limiting sense. The partitioning of examples in function blocks, modules or units shown in the drawings is not to be construed as indicating that these function blocks, modules or units are necessarily implemented as physically separate units. Functional blocks, modules or units shown or described may be implemented as separate units, circuits, chips, functions, modules, or circuit elements. Alternatively, or in addition, one or more functional blocks or units may also be implemented in a common circuit, chip, circuit element or unit.

Figure 1:
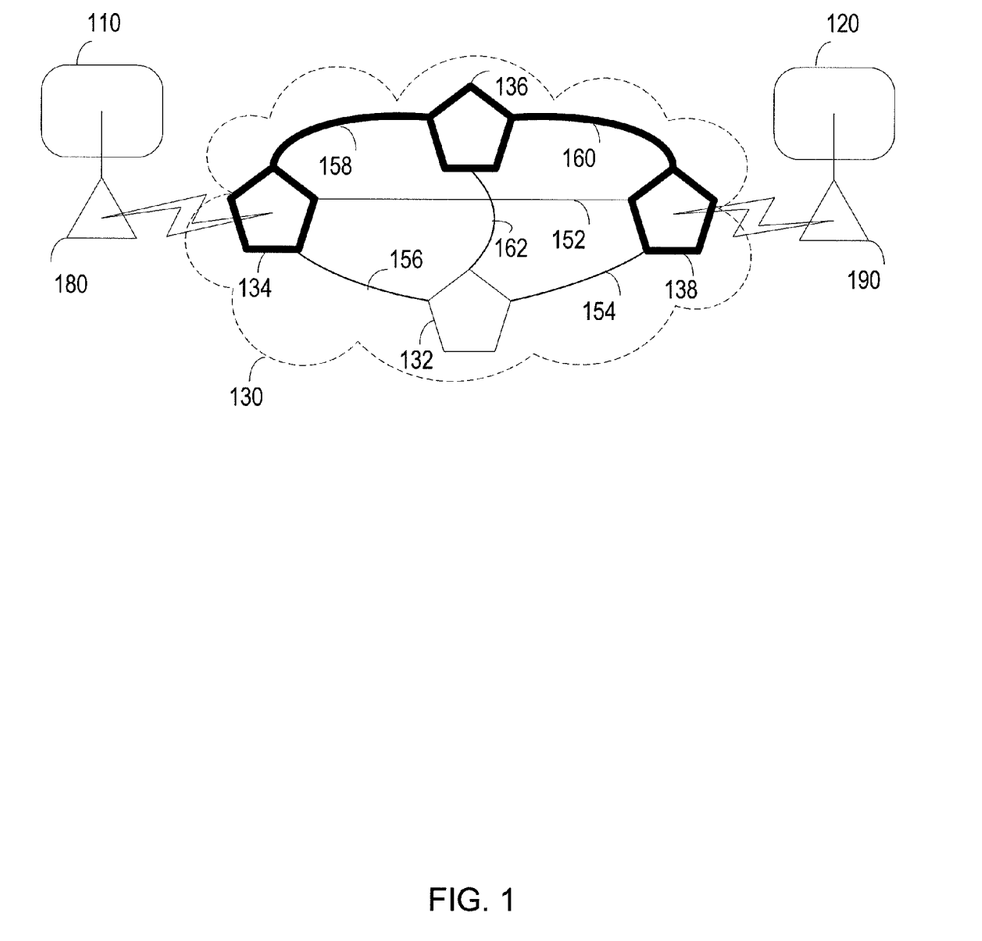
FIG. 1 is a block diagram of an example optical network.

FIG. 1 is a block diagram of an example optical network system. The system may include at least a source router 110 and a destination router 120 capable of communicating with each other over an optical network 130. The source router 110 and the destination router 120 may communicate over the optical network 130 via transponders, such as transponders 180 and 190 respectively. The optical network 130 may include multiple reconfigurable optical add-drop multiplexers (ROADM), such as ROADM 132, 134, 136, and 138 connected with each other via optical links, such as optical links 152, 154, 156, 158, 160, and 162. A one or more of a series of optical links conveying data from one access point in the optical network 130 to another access point in the optical network 130 may be referred to as an optical path. Thus, an optical path may be a point-to-point optical layer connection between two or more access points in the optical network 130. An IP path may be a label switched path through the optical network 130 between two routers, such as the source router 110 and the destination router 120. The IP path may be a series of routers conveying the data from one network interface of the source router 110 to a network interface of the destination router 120 supported by one or more IP links between the series of routers. The data may be routed over the IP path using one of several IP routing protocols available such as Routing Information Protocol (RIP), IS-IS (Intermediate System-Intermediate System). The data may also be routed over the IP path using MPLS techniques. Each IP link may convey data via a corresponding optical path. Each optical path in turn may include one or more optical links. As an illustration, in FIG. 1, a source router 110 and a destination router 120 may communicate over an IP path that includes an IP link between the routers. The IP link may use the optical path shown in bold. The optical path shown includes optical links 158 and 160 between the ROADMs 134, 136, and 138. In other examples, any number/configuration of source routers, ROADMS, and optical paths are possible.

Figure 2:
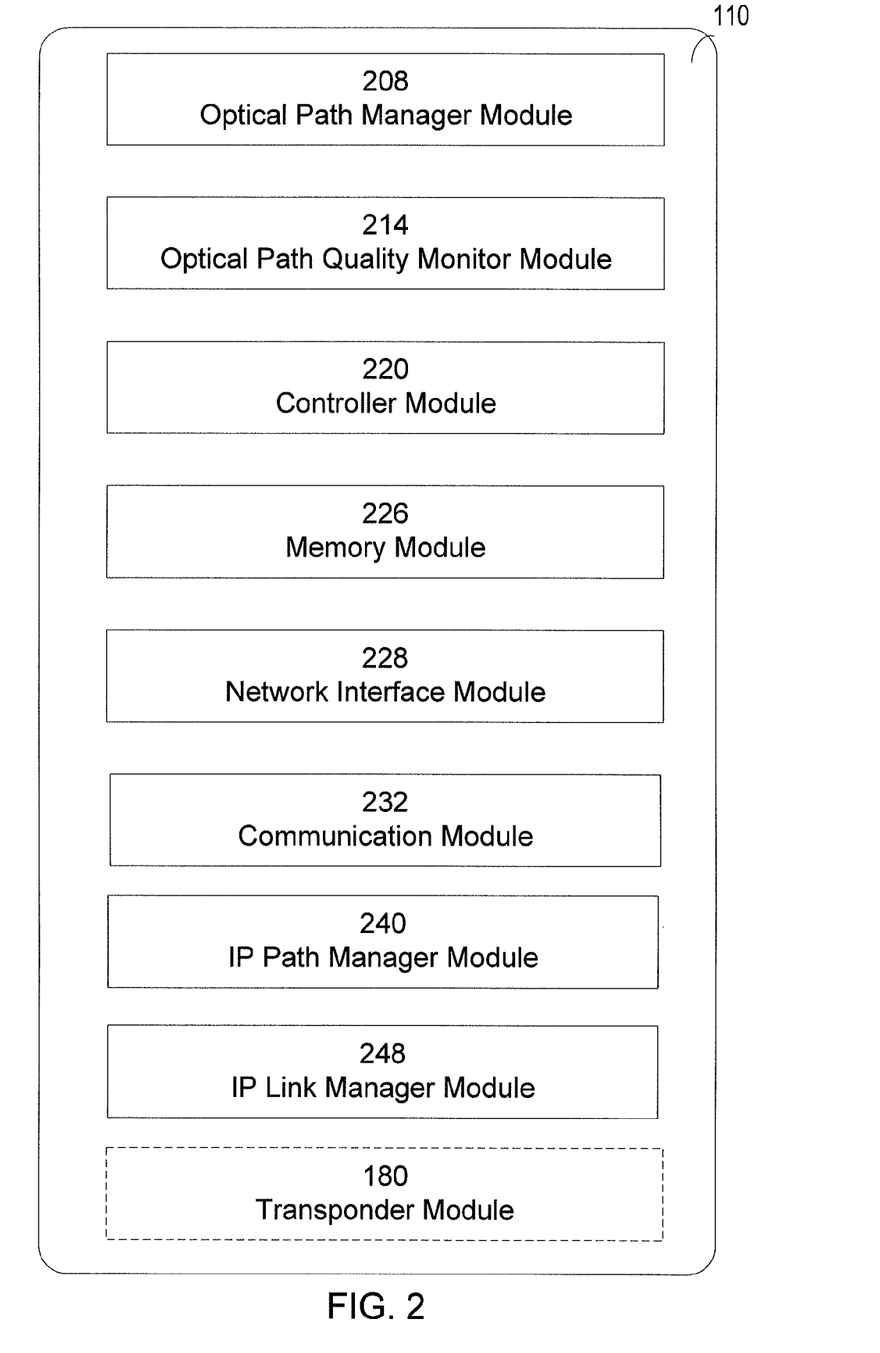
FIG. 2 is a block diagram detailing an example of the components that may be included in a router.

The source router 110 and the destination router 120 may be a network device that is hardware and includes software and/or firmware. The source router 110 may be an IP router capable of Generalized MultiProtocol Label Switching (GMPLS). GMPLS is a set of protocol extensions to MultiProtocol Label Switching (MPLS) that are essential for enabling IP-over-WDM networks. FIG. 2 provides details of an example of the source router 110. The source router 110 may include an optical path manager module 208, an optical path quality monitor module 214, a controller module 220, a non-transitory computer readable memory module 226, a network interface module 228, a communication module 232, an IP path manager module 240, and an IP link manager module 248. The transponder 180 may be a part of the source router 110 or a separate device that the source router 110 may communicate with. The destination router 120 may be an IP router identical to the source router 110. The destination router 120 may be configured differently than the source router 110 and may involve modules that have different capabilities or operate in a different manner than the modules of the source router 110.

Each module described herein, such as the optical path manager module 208, the optical path quality monitor module 214, the controller module 220, and the network interface module 228, the communication module 232, the IP path manager module 240 and the IP link manager module 248 is hardware, or a combination of hardware and software. For example, each module may include and/or initiate execution of an application specific integrated circuit (ASIC), a Field Programmable Gate Array (FPGA), a circuit, a digital logic circuit, an analog circuit, a combination of discrete circuits, gates, or any other type of hardware, or combination thereof. Accordingly, as used herein, execution of a module by a processor can also refer to logic based processing by the module that is initiated directly or indirectly by a processor to complete a process or obtain a result. Alternatively or in addition, each module can include memory hardware, such as at least a portion of a memory, for example, that includes instructions executable with a processor to implement one or more of the features of the module. When any one of the modules includes instructions stored in memory and executable with the processor, the module may or may not include the processor. In some examples, each unit may include only memory storing instructions executable with a processor to implement the features of the corresponding module without the module including any other hardware. Because each module includes at least some hardware, even when the included hardware includes software, each module may be interchangeably referred to as a hardware unit, such as the optical path manager hardware unit, the optical path quality monitor hardware unit, the controller hardware unit, the network interface hardware unit, the communication hardware unit, the IP path manager hardware unit and the IP link manager hardware unit.

The controller module 220 may perform tasks in the source router 110 and control the operation of the source router 110. The memory module 226 may include instructions executable by the controller module 220 or the other modules of the source router 110. The memory module 226 may also be used to store data used in connection with one or more of the other modules of the source router 110. The controller module 220 may be a digital signal processor, a microprocessor or any other form of processing unit/device that is capable of performing logic and/or executing instructions stored on the memory module 226. The controller module 220 may also be capable of receiving signals that trigger execution of a specific sequence of instructions or logic.

The optical path manager module 208 enables management of one or more optical paths from the source router 110 to the destination router 120 over the optical network 130. The optical path manager module 208 may be part of the optical layer. The optical path manager module 208 may manage the optical paths by establishment and tear down of the optical paths as well as monitoring and maintaining various metrics associated with the optical paths.

Figure 3A:
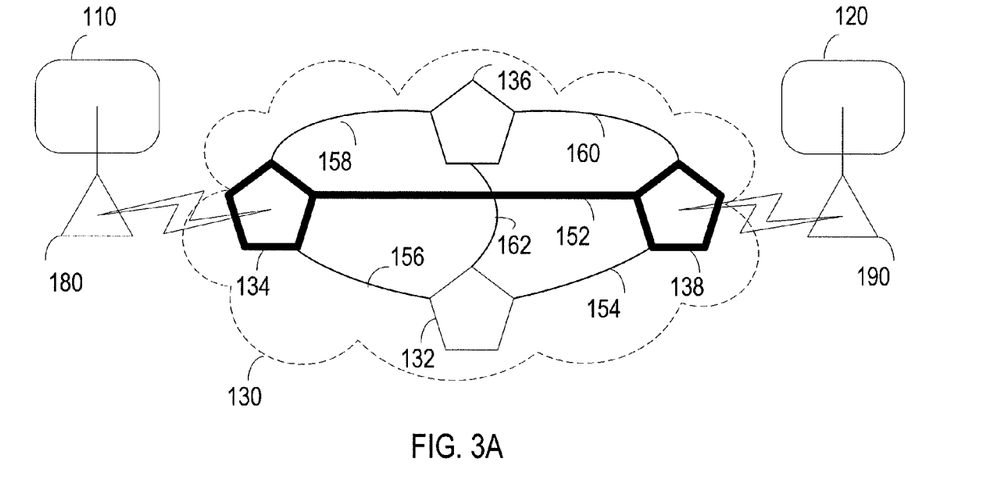
FIG. 3A and FIG. 3B are examples of optical networks with alternate optical paths established for communication between two routers.
Figure 3B:
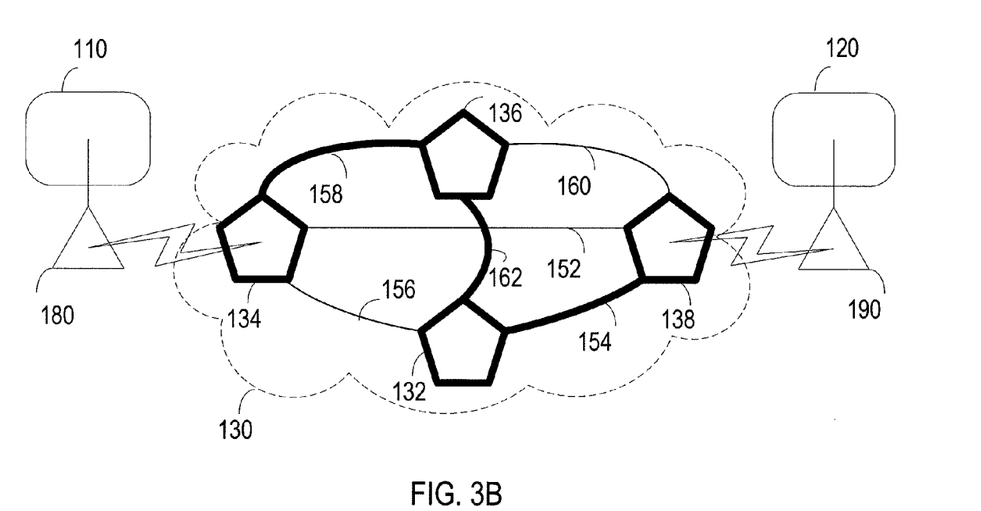

Establishment of an optical path by the optical path manager module 208 may involve identifying components in the optical network 130 to convey data between the source router 110 and the destination router 120. The data may be in the form of IP packets and may be conveyed using any protocol or technique such as MPLS, User Datagram Protocol (UDP, Transmission Control Protocol (TCP), and Hypertext Transfer Protocol (HTTP). The optical path may involve one or more optical links such as one or more of optical links 152, 154, 156, 158, 160, and 162, and one or more ROADMS, such as one or more of ROADMS 132, 134, 136, and 138. Examples of possible optical paths between the source router 110 and the destination router 120 are shown in bold in FIG. 1, as described earlier, as well as in FIG. 3A and FIG. 3B. In FIG. 3A the optical path includes the ROADMs 134 and 138 and the optical link 152. The optical path illustrated in FIG. 3B comprises the ROADMs 132, 134, 136, and 138 via the optical links 158, 162, and 154.

The optical path manager module 208, in response to a request from the controller, may newly establish a second optical path from the source router 110 to the destination router 120 in addition to an existing first optical path between the two routers. The optical path manager module 208 may establish the second optical path using, for example, a second pair of ports that is separate and distinct than the pair of ports used by the existing first optical path. In other examples, some or all of the same ports used in the existing first optical path may also be used for the second optical path.

During example operation, the optical path manager module 208 may identify free ports at the source router 110 and at the destination router 120. The optical path manager module 208 may further identify the transponders 180 and 190 that may be in communication with the source router 110 and the destination router 120 respectively. The optical path manager module 208 may then establish the second optical path between the source router 110 and the destination router 120 using the identified pair of ports via the transponders 180 and 190.

The optical path manager module 208 may also establish the second optical path from the source router 110 to the destination router 120 that is link diverse to the existing first optical path between the source router 110 and the destination router 120. A link diverse optical path is an optical path, such as the second optical path, that does not contain any optical link common to an existing optical path, such as the first optical path. The optical path manager module 208 may establish the link diverse optical path in response to a failure of an optical layer to provide a backup optical path that does not suffer from performance degradation or other problems experienced by the existing optical path. An example of a link diverse optical path is illustrated in FIGS. 1 and 3A where the link diverse optical path, shown in bold in FIG. 3A, is link diverse to the existing optical path, shown bold in FIG. 1. In this example, the link diverse optical path does not contain any of the optical links 158 and 168 that are in the existing optical path. The link diverse optical path may also be specified to not contain a specific optical link. The controller module 220 may specify such properties of the link diverse optical path as part of the request to the optical path manager module 208 to establish the second optical path. The link diverse optical path may contain all optical links from the existing first optical path except for that specific optical link. An example of such a link diverse optical path is shown in bold in FIGS. 1 and 3B. The existing first optical path (shown in bold in FIG. 1) and the link diverse optical path (shown in bold in FIG. 3B) have the optical link 158 in common. Such a link diverse optical path which has one or more overlapping optical links may be referred to as partially link diverse optical path. In addition, the optical path manager module 208 may also establish the second optical path which is a node disjoint optical path from the first optical path. The node disjoint optical path does not have any ROADMs or other nodes in common to the first optical path, where a node may be any intermediate device on the optical path.

To establish a link diverse optical path that is link diverse to an existing first optical path the optical path manager module 208 needs to know the optical links included in the existing first optical path. In case the optical path manager module 208 is establishing the node disjoint optical path, the optical path manager module 208 needs to know the nodes included in the existing first optical path. The optical path manager module 208 may receive such information as part of the request from the controller module 220. Alternately, the optical path manager module 208 may retrieve the information about the existing first optical path, from the memory module 226. The information may be stored in the memory module 226 by the optical path manager module 208 at the time the existing first optical path was established. If the existing optical path was not stored in the memory module 226, or cannot be retrieved, the optical path manager module 208 may identify the optical links and other components that are involved in the existing optical path dynamically and exclude one or all of the identified optical links and/or components when establishing the link diverse optical path or the node disjoint optical path. The optical path manager module 208 may identify the optical links and other components that make up the existing optical path by querying the optical layer. For example, if the optical network 130 uses the Resource Reservation Protocol (RSVP) protocol, the optical path manager 208 may include a Record Route Object (RRO) in a query request. Other protocols may employ other steps to identify the optical links and components of the existing first optical path.

The optical path manager module 208 may tear down an established optical path from the source router 110 to the destination router 120. A tear down of the established optical path may involve removing cross-connects stored in the ROADMS that indicate the series of optical links that are part of the established optical path. Once the optical path has been torn down the source router 110 will no longer be able to receive or transmit data via the optical path. The resources in the optical path that was torn down may continue operating as part of other optical paths.

The IP link manager module 248 may maintain a bundle of IP links between the source router 110 and the destination router 120 corresponding to the optical paths between the two routers. The bundle of IP links is generally referred to as a "link bundle" which may contain one or more IP links. The IP link manager module 248 may add and/or remove an IP link to and from the link bundle. The IP link manager module 248 may distribute data transfers between the source router 110 and the destination router 120 across the IP links and thus the corresponding optical paths in the link bundle. Such distribution may be referred to as load distribution or load balancing across the link bundle. The load balancing of the data transfers may be set up such that each IP link in the link bundle shares a substantially equal part of the load of the data transfers. The load balancing may also be set up such that one or more IP links in the link bundle is responsible for a larger share of the data transfers compared to other IP links in the link bundle. Such an unequal distribution may be based on system parameters, such as a performance rating, or bandwidth associated with one or more of the optical paths corresponding to the IP link. The IP link manager module 248 may assess the performance rating associated with one or more of the optical paths associated with the IP links in the link bundle. The IP link manager module 248 may further manipulate the performance rating associated with one or more of the optical paths by adjusting one or more of the metrics associated with the one or more optical paths. Such manipulation may move data transfers off of an IP link if the IP path manager module 248 reduces the performance rating of the optical path corresponding to that IP link. Similarly, the manipulation may increase the data transfers handled by the IP link if the IP link manager module 248 increases the performance rating associated with the corresponding optical path.

The optical path manager module 208 may establish and tear down optical paths from the source router 110 to the destination router 120 based on a trigger signal received by the controller module 220. The trigger signal may trigger the source router 110 to move the communication of data between the source router 110 and the destination router 120 away from an existing optical path that has been established between the source router 110 and the destination router 120. The trigger signal may be based on a proactive protection mechanism or a coordinated maintenance mechanism. In either case, the controller module 220 may receive the trigger signal to move the communication of data with the destination router 120 off of the existing optical path. As described later with reference to FIG. 5, in the case of the proactive protection mechanism, the controller module 220 may receive the trigger signal from the transponder 180 or the optical path quality monitor module 214. Alternately, the trigger signal may be received from a centralized controller. The centralized controller may overlook operations of the system or the optical network 130. The centralized controller may, thus, identify an impending failure (e.g. based on transmission margins or bit error rates) and notify a pertinent node to start optical restoration. The optical restoration may involve triggering the source router 110 to move the communication of data with the destination router 120 away from the existing optical path. In the case of the coordinated maintenance mechanism, the controller module 220 may receive the trigger signal from the network interface module 228.

In response to the trigger signal, the optical path manager module 208 may establish the second optical path to the destination router 120. The optical path manager module 208 may also tear down the existing first optical path to the destination router 120. Establishment of the second optical path may occur before tearing down the existing first optical path. Alternatively, tear down of the existing first optical path may occur before establishing the second optical path.

Figure 4:
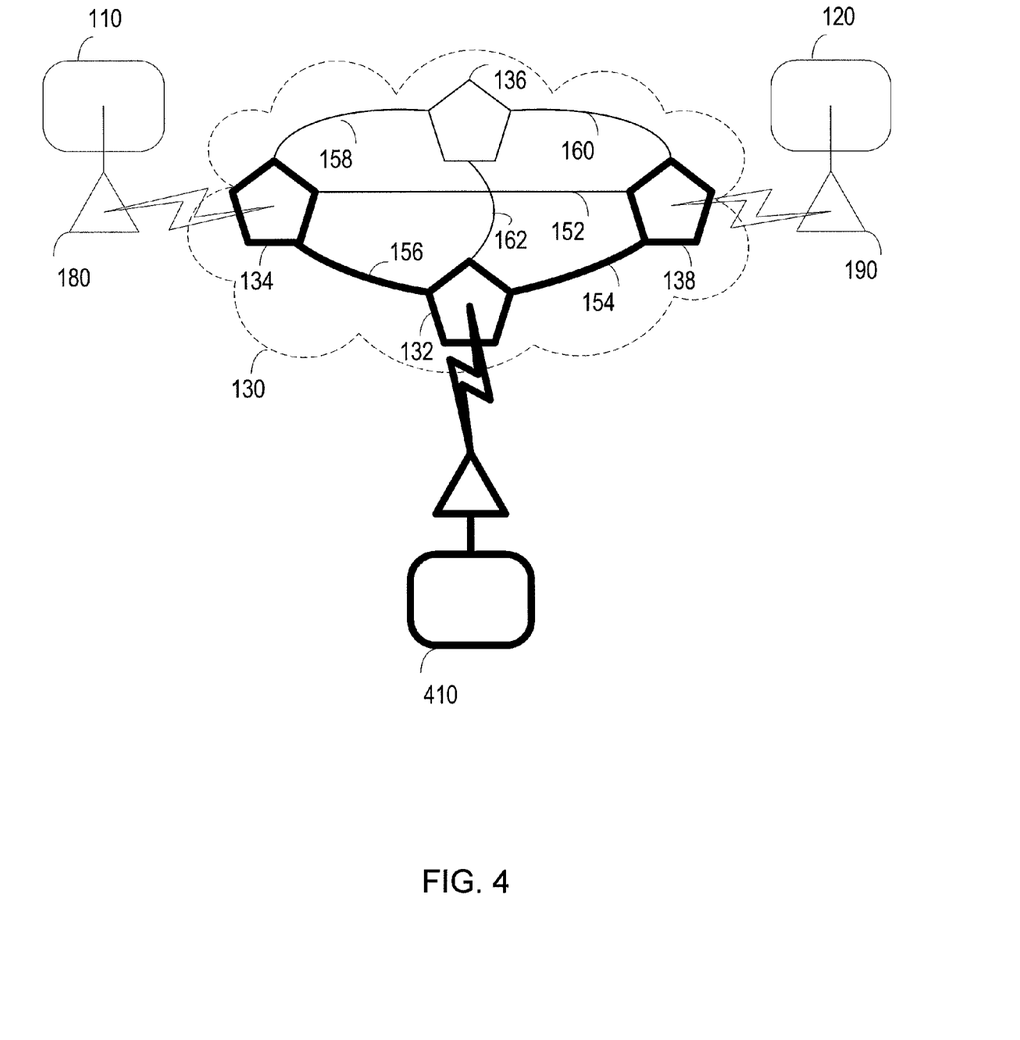
FIG. 4 is a block diagram of an example optical network with an alternate IP path established for communication between two routers via an intermediate router.

The IP path manager module 240 enables management of one or more IP paths from the source router 110 to the destination router 120 over the optical network 130. The IP path manager module may also be called a routing module. The IP link manager module 248 enables management of the IP links involved in the IP path between two routers. The IP link manager module 248 coordinates with the optical path manager module 208 to establish optical paths corresponding to the IP links. A first IP path between the source router 110 and the destination router 120, such as the example shown in FIG. 1, involves a first IP link between the routers that uses the existing optical path without any intermediate routers. The IP path manager module 240 may establish a second IP path that involves an intermediate router 410, such as in the example shown in bold in FIG. 4. Alternately, in response to the trigger signal received by the controller module 220, the IP path manager module 248 may reconfigure the first IP path and replace the IP links of the first IP path such that the data transfers from the source router 110 to the destination router 120 occur via the intermediate router 410. In both scenarios, either establishing the second IP path or replacing the IP links of the first IP path, the data transfers from the source router 110 to the destination router 120 may be illustrated as shown in FIG. 4. The data transfers from the source router 110 are first transmitted over a second IP link to the intermediate router 410, where they are forwarded on to the destination router 120 over a third IP link. The ROADMs 132 and 134 and the optical link 156 form a third optical path to support the second IP link between the source router 110 and the intermediate router 410. The ROADMs 132 and 138 and the optical link 154 form a fourth optical path to support the third IP link between the intermediate router 410 and the destination router 120. The third and fourth optical paths convey the data transfers among the source router 110, the intermediate router 410 and the destination router 120. If the second IP path is established between the source router 110 and the destination router 120, the IP path manager module 240 may also tear down the existing first IP path between the source router 110 and the destination router 120. The tear down of the existing IP path may involve tearing down the IP links that are included in the existing IP path. Once the existing IP path has been torn down the source router 110 may not be able to receive or transmit data via the existing IP path anymore. The components in the existing IP path that was torn down continue operating and may be involved in another IP path.

The transponder module 180 or the optical path quality monitor module 214 may send the trigger signal to the controller module 220 based on a performance degradation of an optical link that is a part of the existing optical path between the source router 110 and the destination router 120. The performance degradation may be indicated by an increase (or decrease) in a metric associated with the optical link, such as a bit error ratio (BER). The metric may be monitored by the transponder 180 or the optical path quality monitor module 214. The optical path quality monitor module 214 may be a part of the transponder 180. Alternatively, the optical path quality monitor module 214 may be closely coupled with the transponder 180 to monitor the metrics. A pre-Forward Error Correction Bit Error Ratio (pre-FEC BER) may be monitored to determine the performance degradation of an optical link or an optical path. The monitored metric may be compared to a predetermined threshold and when the predetermined threshold is exceeded, the trigger signal is sent to the controller module 220. The predetermined threshold is separate and distinct from a second threshold that indicates a complete failure of the optical link. While the metric is below the second threshold, the optical link may be considered to be in a predetermined acceptable range and the optical link may be considered by the controller module 220 to be operating without a failure. Another example of a degradation of the optical link may involve monitoring an accumulated noise or other impairments introduced in the data being transferred by the components along the optical path. An optical control plane or the path quality monitor module 214 may determine that the optical path is prone to failure in response to a noise margin associated with the optical path dropping below a predetermined threshold value. The noise margin indicates the amount of noise the optical path may tolerate. In this case the transponder module 180 may also send the trigger signal to the controller module 220

The network interface module 228 may send a trigger signal to the controller module 220 when a node of the optical network 130, such as the network interface module 228, is put into coordinated maintenance mode. Alternately, the centralized controller may send the trigger signal to the controller module 220 in response to the node of the optical network 130 being put into coordinated maintenance mode. In coordinated maintenance, an administrative state of the transponder module 180 or a port of the source router 110 configured to communicate with the transponder module 180 is changed to maintenance mode. The change to maintenance mode may be direct or indirect. The change may be direct when the transponder 180 is manually set into maintenance mode by an operator. The change may be indirect when a link or a node in the optical layer is set into maintenance mode and such a setting is relayed to the transponder module 180. The setting may be relayed to the transponder via a control plane or by the optical path manager module 208, which causes the transponder module 180 to go into maintenance mode. The source router 110 may transfer and receive data to and from the destination router 120 via the network interface module 228 via a physical port. The network interface module 228 may be switched into coordinated maintenance mode manually by a network administrator or automatically for scheduled maintenance without any indication of performance degradation or error in the communication of data between the source router 110 and the destination router 120. In addition, or alternatively, the network interface module 228 may be switched into maintenance mode manually or automatically based on a set schedule. While switching the network interface module 228 into maintenance mode, the optical path manager module 208 may be notified of optical links that would not be available for establishing the second optical path to the destination router 120. Alternately, the optical path manager module 208 may be informed of optical links to be avoided when establishing the second optical path to the destination router 120. The optical path manager module 208 may establish the second optical path that is link diverse to such optical links specified during the maintenance mode switch. Establishing the second IP path from the source router 110 to the destination router 120 may involve establishing the second optical path. Therefore, the optical path manager module 208 may also be informed of the optical links to be avoided when establishing the second optical path as a part of the second IP path.

The communication module 232, also referred to as a communicator, manages the communication of data between the source router 110 and the destination router 120. The communication module 232 may decide which IP link between the source router 110 and the destination router 120, in a case where there are two or more IP links, to communicate the data on. The communication module 232 may divert the communication of data between the source router 110 and the destination router 120 from a first IP link to a second IP link. The communication module 232 may further move the communication of data from the second IP link to a third IP link. The communication module 232 may divert the communication of data from the first IP link to the second IP link in response to, for example, establishment of the second IP link by the IP link manager module 248 which in turn may have been established in response to the trigger signal. Since each IP link uses a particular optical path, the communicator module 232 may divert the communication of data from the first optical path to the second optical path. As an example, if the first IP link corresponds to a first optical path and the second IP link corresponds to a second optical path, diverting the communication of data from the first IP link to the second IP link results in diverting the communication of data from the first optical path to the second optical path.

The communication module 232 may make this decision based on the performance rating of the optical paths associated with the IP links between the source router 110 and the destination router 120. The communication module 232 may perform the diversion based on a configuration setting indicating a preferred technique. The communication module 232 may delegate some of its functionality to the transponder module 180, in which case the transponder module 180 may decide the optical path used for the communication of data between the source router 110 and the destination router 120. Further, the communication module 232 may coordinate with the IP link manager 248 to use the link bundle to perform the diversion by manipulating the performance rating associated with the optical paths associated with the IP links in the link bundle.

Figure 5:
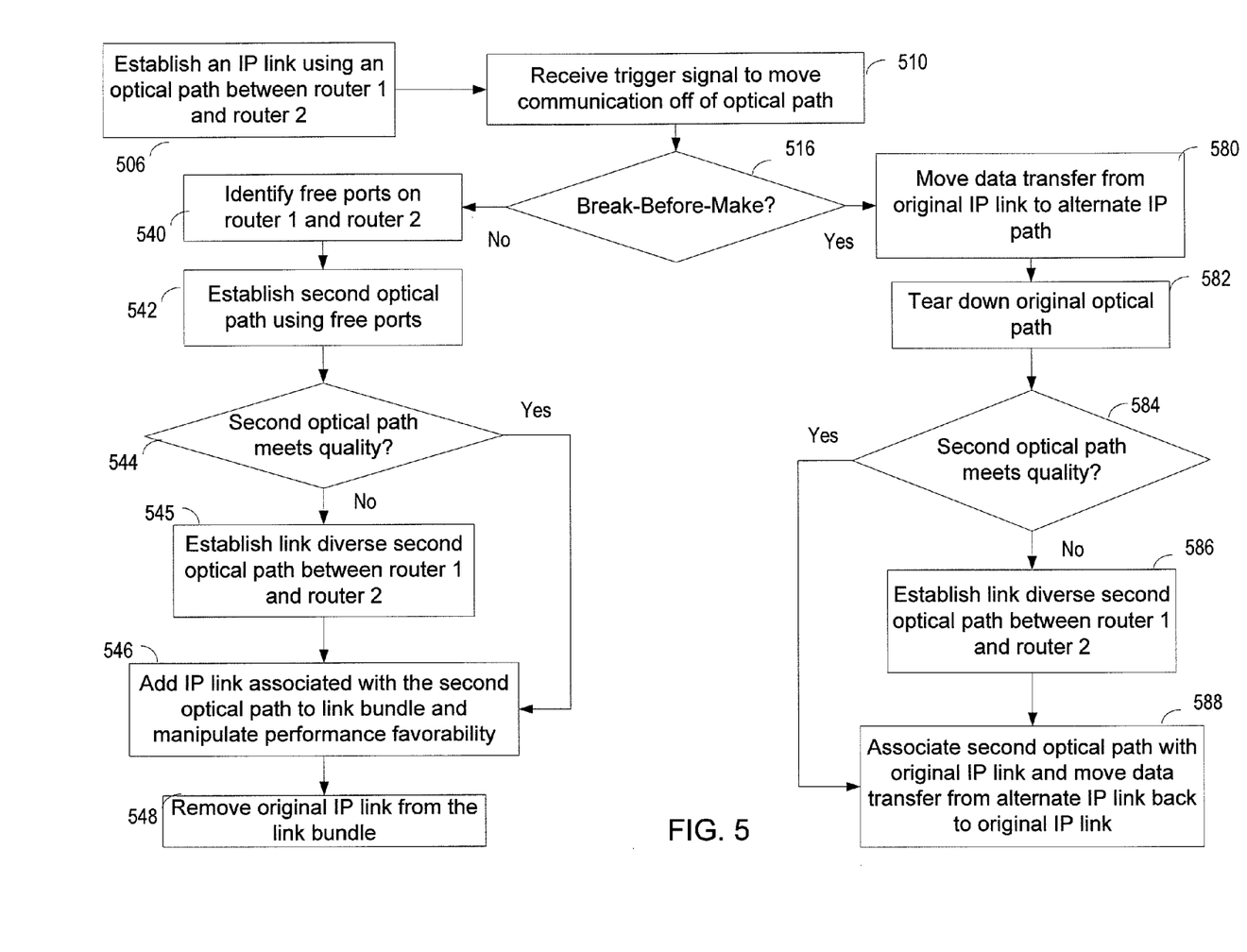
FIG. 5 is a block diagram of an example operational flow diagram to maintain communication between two routers according to the proactive optical restoration system.

FIG. 5 illustrates an example operational flow diagram of the source router 110 to move the communication of data with the destination router 120 off of the existing optical path established in 506. The move of the communication of data off of the existing optical path may be in response to the controller module 220 receiving the trigger signal in 510.

In response to the trigger signal, the IP path manager module 240 may reconfigure the IP path from the source router 110 to the destination router 120 via the intermediate router 410 as illustrated in FIG. 4. The selected option for this process is based on an operator policy configuration that indicates a preference between a make-before-break technique and a break-before-make technique described below. The reconfigured IP path may involve a different set of IP links, a first IP link from the source router 110 to the intermediate router 410 and a second IP link from the intermediate router 410 to the destination router 120. The IP links of the reconfigured IP path may correspond to optical paths associated with a respective IP link, the second optical path from the source router 110 to the destination router 120 and a third optical path from the intermediate router 410 to the destination router 120. In response to selection of the break-before-make technique, as determined in 516, the communication module 232 may move the communication of data from the first IP link, and hence the existing optical path, to the optical paths corresponding to the IP links of the reconfigured IP path via the intermediate router 410 in step 580. The controller module 220 may wait for a predetermined amount of time to allow all the communication of data to be completely moved to the new optical paths. The controller module 220 may then trigger a multi-layer restoration that may cause the optical path manager module 208 to tear down the existing optical path and the IP link manager module 248 to tear down the existing IP link at block 582. In block 584, the IP link manager module 248 may establish a new IP link between the source router 110 and the destination router 120 using the network interfaces that were used for the existing IP link. This may involve the optical path manager module 208 establishing a second optical path between the source router 110 and the destination router 120. In 584, the second optical path is tested to determine that it does not have similar issues that may have caused the trigger signal by checking predetermined quality parameters associated with the second optical path. If the second optical path does not meet predetermined quality parameters, in 586, an optical path that is link diverse to the existing optical path is established by the optical path manager module 208. Alternately, the optical path manager module 208 establishes the node disjoint optical path to the existing optical path. In 588 the IP link manager module 248 may associate the second optical path with the new IP link between the source router 110 and the destination router 120. The communication module 232 may then move the communication of data from the IP links corresponding to the reconfigured IP path back to the existing IP link that now uses the second optical path. This method of moving the communication of data away from the existing optical path is sometimes referred to as a "break-before-make" mechanism considering that the existing optical path may be torn down before the second optical path is established.

If the make-before-break technique is selected, the controller module 220, may initiate the optical path manager module 208 to establish the second optical path between the source router 110 and the destination router 120 without involving the IP layer. The communication module 232 may coordinate with the optical path manager module 208 to identify the second pair of ports in 540 and then establish the second optical path using the second pair of ports in 542. In 544, the quality of the second optical path may be tested to make sure it meets desired quality parameters. In 545, a link diverse second optical path may be established in response to the second optical path not meeting the desired quality parameters. In 546, the IP link manager module 248 may add an IP link associated with the second optical path to the link bundle which may contain the existing IP link. The IP link manager module 248 may perform load balancing of the communication of data between the source router 110 and the destination router 120 across the link bundle. The IP link manager module 248 may further manipulate the performance rating of the existing optical path such that the second IP link is favored over the existing IP link. Based on the performance rating of the optical paths, the transponder module 180 may divert the communication of data to the second optical path. The IP link manager module 248, in step 548, may remove the existing IP link from the link bundle and tear down the existing optical path. Moving the communication of data off of the existing IP link using the link bundle, may allow a hitless transition of the communication of data to the second optical path. This hitless method for the move of the communication of data may be referred to as a "make-before-break" mechanism where the second optical path is established before the existing optical path is torn down.

The predetermined quality parameters used in steps 544 and 584 may vary from case to case. The quality parameters may include a quality standard that is based on the bit-error ratio or the transmission quality margins. If the trigger signal received by the controller module 220 is based on a degraded optical link in the existing optical path, it may be necessary to determine if the second optical path contains the degraded optical link. If the root cause of the performance degradation of the existing optical path cannot be determined and pinpointed to a particular optical link or some other component of the optical network 130, it may be necessary to determine if the second optical path suffers from similar performance degradation. A link diverse optical path may ensure that the communication of data between the source router 110 and the destination router 120 continues without the performance degradation. In case the trigger signal is received by the controller module 220 based on a network interface entering maintenance mode, the optical links that the maintenance may affect may be known. Thus, the optical path manager module 208, by establishing the link diverse optical path, may establish the second optical path circumventing the affected resources.

Various embodiments described herein can be used alone or in combination with one another. The foregoing detailed description has described only a few of the many possible implementations of the present disclosure. For this reason, this description of example embodiments is intended by way of illustration, and not by way of limitation.

I claim:

1. A router comprising:
 a communication module configured to communicate data with a destination router via an internet protocol (IP) path comprising an IP link that uses a first optical path;
 a controller module configured to receive a signal to move the communication of data away from the first optical path that extends from a source router to the destination router, wherein the signal is received from at least one of:
  a transponder configured to detect a degradation in communication performance of an optical link included in the first optical path;
  a router port used during the communication between the source router and the destination router, wherein the router port is configured to send the signal in response to the router port or the first optical path being placed into a maintenance mode; or
  a centralized controller configured to monitor a system that includes the source router and the destination router, wherein the centralized controller is further configured to transmit the signal in response to detection of the degradation in communication performance of the optical link included in the first optical path or in response to detection of the router port or the first optical path being placed into the maintenance mode;
 an optical path manager configured to establish a second optical path from the source router to the destination router;
 an IP link manager configured to move the communication of data with the destination router to the second optical path; and
 the optical path manager configured to tear down the first optical path.

2. The router of claim 1, further comprising: a quality monitor configured to monitor a metric associated with the first optical path and send to the controller module the signal to move the communication of data away from the first optical path, the signal sent in response to a performance degradation of communication performance of the first optical path, the performance degradation determined by comparison of the monitored metric associated with the first optical path with a predetermined threshold value.

3. The router of claim 2, wherein the monitored metric is a bit error ratio.

4. The router of claim 1, further comprising: a network interface configured to send the signal to the controller module to move the communication of data away from the first optical path in response to the network interface being switched into maintenance mode.

5. The router of claim 1, wherein the IP link is a first IP link and wherein the IP link manager is further configured to:
 add a second IP link corresponding to the second optical path to a link bundle comprising IP links between the router and the destination router, the first IP link being a part of the link bundle;
 distribute the communication of data with the destination router across the link bundle; and
 remove the first IP link from the link bundle to move the communication of data with the destination router away from the first optical path.

6. The router of claim 5, wherein the IP link manager is further configured to manipulate a communication performance rating of the second optical path to make the second IP link more favorable for the communication of data than the first IP link.

7. The router of claim 1, wherein the IP link is a first IP link, and wherein, on receipt of the signal and prior to establishment of the second optical path:
 the communication module is configured to move the communication of data between the router and the destination router to a second IP link and a third IP link wherein:
  the second IP link is between the router and an intermediate router and the second IP link uses a third optical path established by the optical path manager, the third optical path from the router to the intermediate router; and
  the third IP link is between the intermediate router and the destination router and the third IP link uses a fourth optical path, the fourth optical path from the intermediate router to the destination router; and
 wherein, after establishment of the second optical path the communication module is further configured to move the communication of data to the second optical path by restoration of the communication of data from the second IP link and the third IP link to the first IP link.

8. The router of claim 1, wherein the optical path manager is further configured to establish the second optical path to be link diverse to the first optical path, wherein the link diverse second optical path does not contain an optical link of the first optical path, and wherein the optical link of the first optical path is identified to have communication performance rating below a predetermined threshold.

9. The router of claim 2, wherein the monitored metric is a transmission quality margin.

10. A method comprising:
 establishing, using a processor, a first optical path for data transfers between a first router and a second router over an optical network, the first optical path associated with a first internet protocol (IP) link between the first router and the second router;
 receiving a trigger at the processor from at least one of:
  a transponder configured to detect a degradation in communication performance of an optical link included in the first optical path;
  a router port used during the communication between the first router and the second router, wherein the router port is configured to send the trigger in response to the router port or the first optical path being placed into maintenance mode; or
  a centralized controller configured to monitor a system that includes the first router and the second router, wherein the centralized controller is further configured to transmit the trigger in response to detection of the degradation in communication performance of the optical link included in the first optical path or in response to detection of the router port or the first optical path being placed into maintenance mode;

as a result of receiving the trigger, using the processor, establishing a second optical path between the first router and the second router, before failure of communication over the first optical path; and moving, using the processor, the data transfers between the first router and the second router via the first optical path to the second optical path.

11. The method of claim 10, wherein the establishment of the second optical path further comprises:

identifying, using the processor, a free router interface on the first router; and establishing, using the processor, the second optical path between the free router interface and the second router;

adding, using the processor, the first IP link associated with the first optical path and a second IP link associated with the second optical path to a link bundle, wherein the link bundle comprises a plurality of IP links between the first router and the second router;

load balancing, using the processor, the data transfers between the first router and the second router between the IP links in the link bundle; and removing, using the processor, the first IP link associated with the first optical path from the link bundle.

12. The method of claim 10, wherein the triggering is based on at least one of:

detecting a performance degradation of communication via the first optical path; or detecting a router interface on the first optical path being scheduled for maintenance.

13. The method of claim 11, wherein moving the data transfers between the first router and the second router via the first optical path to the second optical path further comprises:

manipulating, using the processor, a performance rating of the second optical path in relation to the first optical path to render the second IP link more favorable for the data transfers than the first IP link; and moving, using the processor, the data transfers between the first router and the second router to the second IP link due to higher favorability.

14. The method of claim 10, wherein moving the data transfers between the first router and the second router via the first optical path to the second optical path further comprises:

prior to establishment of the second optical path:

identifying, using the processor, a second IP link between the first router and a third router, the second IP link associated with a third optical path from the first router to the third router;

identifying, using the processor, a third IP link between the third router and the second router, the third IP link associated with a fourth optical path from the third router to the second router;

moving, using the processor, the data transfers between the first router and the second router to the second IP link and the third IP link to move the data transfers off of the first optical path; and tearing down, using the processor, the first optical path; and in response to establishment of the second optical path:

associating the first IP link with the second optical path; and moving, using the processor, the data transfers between the first router and the second router back to the first IP link associated with the second optical path.

15. The method of claim 12, further comprising:

determining, using the processor, that the second optical path fails to meet a performance quality standard;

tearing down, using the processor, the second optical path;

establishing, using the processor, a third optical path between the first router and the second router, the third optical path link diverse from the first optical path; and moving, using the processor, the data transfers between the first router and the second router to the third optical path by associating the first IP link with the third optical path.

16. The method of claim 15, wherein establishing the third optical path comprises:

detecting, using the processor, optical links of the first optical path before tearing down the first optical path; and excluding, using the processor, the optical links of the first optical path during establishment of the third optical path.

17. A system comprising:

a first router configured to communicate over an optical network with a second router via a first optical path corresponding to an IP link;

the first router configured to receive a trigger to move the communication with the second router off of an optical link included in the first optical path, the trigger received before the optical link fails, wherein the trigger is received from at least one of:

a transponder, wherein the transponder is configured to detect a degradation in communication performance of the optical link included in the first optical path;

a router port used during the communication between the first router and the second router, wherein the router port is configured to send the trigger in response to the router port or the first optical path being placed into maintenance mode; or a centralized controller configured to monitor the system, wherein the centralized controller is further configured to transmit the trigger in response to detection of the degradation in communication performance of the optical link included in the first optical path or in response to detection of the router port or the first optical path being placed into maintenance mode;

the first router configured to establish a link diverse second optical path for the communication with the second router;

the first router configured to associate the link diverse second optical path with the IP link; and the first router configured to move the communication with the second router to the second optical path.

18. The system of claim 17, wherein the IP link is the first IP link and wherein the first router is further configured to:

establish the second optical path between a first free router interface on the first router and the second router;

add a second IP link associated with the second optical path to a link bundle between the first router and the second router, the link bundle including the first IP link;

distribute the communication with the second router across a plurality of IP links in the link bundle; and remove the first IP link from the link bundle.

19. The system of claim 17, wherein the IP link is a first IP link and wherein prior to the establishment of the second optical path, the first router is further configured to:

move the communication with the second router from the first IP link to a combination of a second IP link and a third IP link wherein, the second IP link is from the first router to a third router and the third IP link is from the third router to the second router and further, the second IP link is associated with a third optical path and the third IP link is associated with a fourth optical path;

tear down the first optical path; and after establishment of the second optical path, the first router is further configured to:

associate the first IP link with the second optical path; and move the communication with the second router from the combination of the second IP link and the third IP link back to the first IP link.

* * * * *